United States Patent [19]

Park

[11] Patent Number: 5,527,093
[45] Date of Patent: Jun. 18, 1996

[54] BUILT-IN TYPE CHILD SEAT

[75] Inventor: Gil S. Park, Ayase, Japan

[73] Assignee: Ikeda Bussan Co., Ltd., Ayase, Japan

[21] Appl. No.: 357,739

[22] Filed: Dec. 16, 1994

[30] Foreign Application Priority Data

Dec. 27, 1993 [JP] Japan .................... 5-351682

[51] Int. Cl.⁶ .................................................. B60R 22/34
[52] U.S. Cl. ............................................ 297/238; 297/484
[58] Field of Search ................................ 297/238, 112, 297/230.13, 255, 256.15, 234, 378.1, 484, 486, 487, 467

[56] References Cited

U.S. PATENT DOCUMENTS

| | | | |
|---|---|---|---|
| 4,690,449 | 9/1987 | Holman | 296/65 R |
| 4,690,455 | 9/1987 | Bailey et al. | 297/238 |
| 4,900,086 | 2/1990 | Steward | 297/238 |
| 4,900,087 | 2/1990 | Crisp | 297/238 |
| 4,936,627 | 6/1990 | Guim | 297/238 |
| 5,106,158 | 4/1992 | Dukatz et al. | 297/396 |
| 5,332,284 | 7/1994 | Elton et al. | 297/484 X |
| 5,398,997 | 3/1995 | McFalls | 297/484 X |

FOREIGN PATENT DOCUMENTS

| | | |
|---|---|---|
| 56-28023 | 3/1981 | Japan . |
| 6286509 | 10/1994 | Japan .................. 297/238 |
| 88/05733 | 8/1988 | WIPO . |

OTHER PUBLICATIONS

Patent Abstracts of Japan vol. 12, No. 409, (M–758), Oct. 28, 1988, abstract of Kazuo Ebimoto, "Seat Device For Vehicle", Japanese 63–149240, Jun. 22, 1988.
Patent Abstract of Japan vol. 17, No. 598, (M–1504), Nov. 02, 1993, abstract of Omiya Masaki, "Vehicle Seat Provided With Child's Seat", Japanese 51–78136, Jul. 20, 1993.
Patent Abstract of Japan vol. 9, No. 73, (M–368), abstract of Hosoe Takashi, "Seat", Japanese 59–202942, Nov. 16, 1984.

*Primary Examiner*—Laurie K. Cranmer
*Attorney, Agent, or Firm*—Foley & Lardner

[57] ABSTRACT

A built-in child seat for an automotive vehicle is accommodated within a recess portion of a seat back of a bench type automotive seat. The child seat may be disposed in a retracted or unfolded position and is constructed such that, in an unfolded condition, wing portions are disposed on either side of the child seat cushion for stabilizing an occupant of the seat against laterally applied forces. Further, a T-shape chest support portion is rotatably hinged to a forward portion of the seat cushion to be upwardly oriented for stably supporting a seat occupant's body and legs with simple and convenient structure. Belt adjusting mechanisms are provided for allowing the child seat to be adjusted according to the size of the seat occupant.

11 Claims, 4 Drawing Sheets

BUILT-IN TYPE CHILD SEAT

BACKGROUND OF THE INVENTION

1. Field of the Invention

The present invention relates generally to a child-seat for automotive vehicles. Particularly, the present invention relates to a child-seat which can be withdrawably accommodated in a concave space in a bench-type automotive seat.

2. Description of the Related Art

Various types of child seats for automotive vehicles have been proposed for promoting increased safety for young children being transported by car, bus, etc. Generally, such child seats are constructed for restraining and protecting a child seat thereon. Recently, so-called 'built-in' child seats which are permanently installed in a bench seat of an automobile or the like, have been popular for providing highly stable seating for child passengers.

For example, one such previously proposed built-in child seat has been disclosed in. Japanese Patent Application No. 56-28023. This document teaches a child seat built-in to a rear passenger bench seat of an automobile at a center, arm rest position. The seat unfolds from the seat back of the bench seat. The built-in nature of the seat promotes ease of use and since in may be folded within the seat back of the vehicle when not in use, no storage problem is presented when the child seat is not used.

However, such conventional, built-in child seats may be susceptible to swinging motion (laterally applied force) during turning etc., further, such conventional arrangements do not seek means for stabilizing a child's legs and feet. Also, the cushion and safety pad portions of such conventional seats are attached by a pair of hinges, however, greater lateral stability than can be provided by such arrangements has been desired.

In addition, such conventional built-in child seats are arranged such that, in an unfolded condition, the seat cushion of the child seat is positioned suspended above the seat cushion of the vehicle seat. Thus, the seat cushion of the child seat is susceptible to a tendency to swing back and forth in response to lateral G forces generated in vehicle cornering, and the like.

Other factors which are desirable in child-seating for moving vehicles are increased stability in a back support for child seats and adjustability for accommodating different builds of various children, or to compensate for a child's growth while still using such a vehicular child seat.

Thus is has been required to provide a built-in child seat for an automotive vehicle with simple easy to use structure which provides stable support when in use, including substantial stability against laterally applied forces.

SUMMARY OF THE INVENTION

It is therefore a principal object of the present invention to overcome the drawbacks of the related art.

It is a further object of the present invention to provide a child seat having increased stability and adjustability for accommodating different or growing children.

It is also an objection of the invention to provide a built-in child seat for an automotive vehicle having a simple structure which may provide stable support when in use, including substantial stability against laterally applied forces.

In order to accomplish the aforementioned and other objects, a built-in child seat for an automotive vehicle is provided, comprising:

DESCRIPTION OF THE PREFERRED EMBODIMENT

Figure 1:
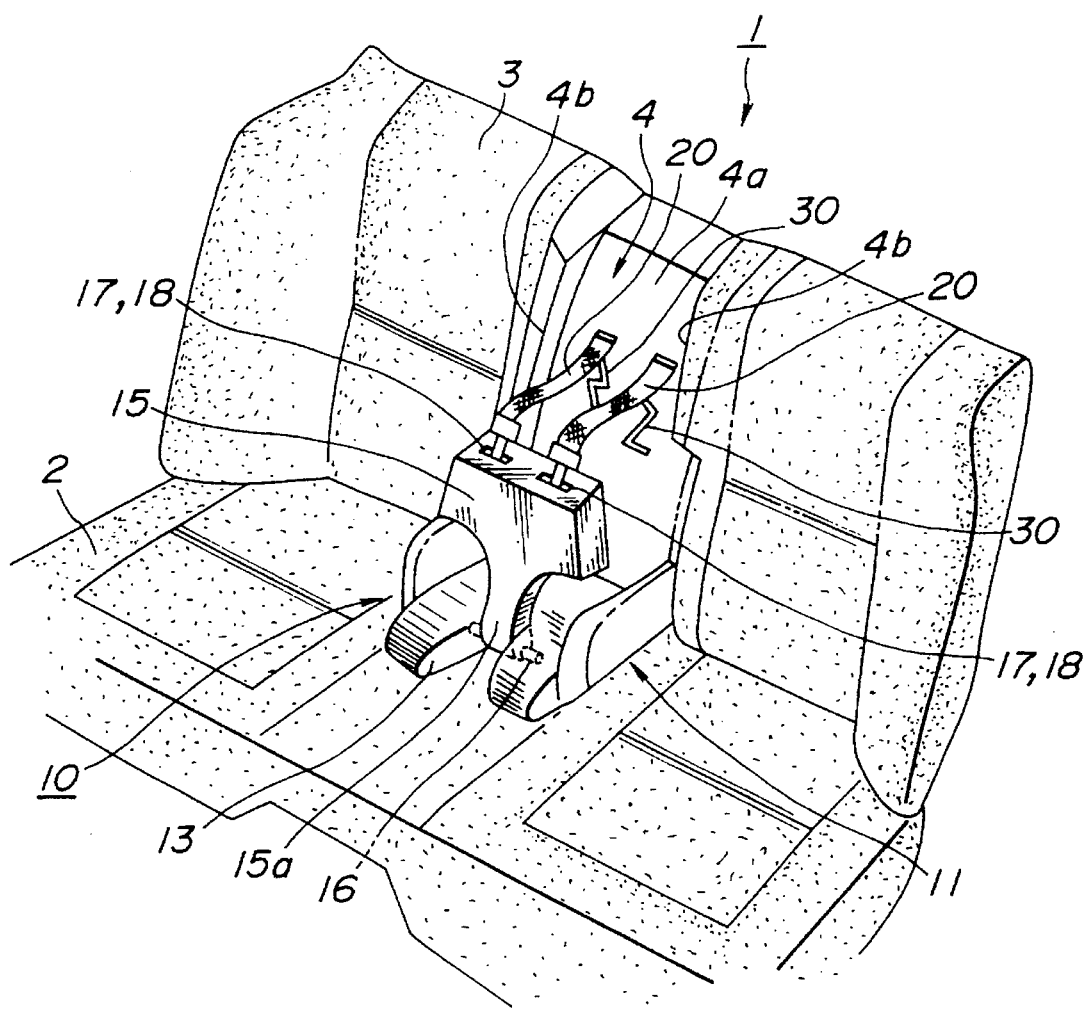
FIG. 1; is a schematic perspective view of a preferred embodiment of a child seat according to the invention showing an unfolded state of the seat.

Referring now to the drawings, a built-in child seat according to the invention will be described hereinbelow in detail.

FIGS. 1 to 4 show a preferred embodiment of a built-in automotive child seat (hereinbelow: child seat) according to the invention. The child seat 10 is installed in a vehicular bench seat 1, usually a rear seat of a passenger vehicle, or the like. The bench seat includes a seat cushion 2 and, at a center of the seat back 3 of the bench seat 1, a recess 4 is provided. The child seat 10 according to the invention is arranged to fold into and be unfolded from the recess 4.

The child seat 10 comprises a seat cushion 11 which may be folded pivotally up and down to act as a seat cushion when the child seat is unfolded and a bottom side of the seat cushion 11 acts as a cover for the child seat 10 when in a folded condition. When the child seat 10 is unfolded, such as pictured in FIG. 1, a rear wall of the recess 4 acts as a child seat back 4a. Two wing portions 12, 12 are disposed at seat side of the seat cushion 11 such that, a child seated in the child seat 10 is firmly held at each side thereof between the wings 12, 12. Further, as seen in FIG. 8, when the child seat 1 is unfolded, a child seat therein will rest against the child seat back 4a, which is formed by the rear wall of the recess, thus the adjoining seat back 8 of the bench seat 1 at each side thereof further serve to nestle the child firmly in the seat and thus the child is substantially protected from lateral G forces which may occur during cornering, etc. It will be noted from the drawing that side cushion members 4b, 4b are formed on inner side walls of the recess 4 for enhancing the comfort of the recessed child seat 10. It will be noted that, according to the above description, the single seat cushion 11 may be folded down from the seat back 8 of the bench seat 1 and thus quickly and simply provides a recessed child seat 10 wherein the two wings 12, 12 and the side cushions 4b, 4b collectively act to comfortably retain the sides of the body of a seat occupant. Thus a child seat having high security and protection against lateral G forces may be provided at low cost.

It will also be noted that, in the unfolded condition, the seat cushion 11 of the child seat 10 is stably positioned atop the seat cushion 2 of the bench seat. Thus, the seat cushion 11 of the child seat resists a tendency to swing from side to side during cornering of the vehicle, or the like.

Figure 2:
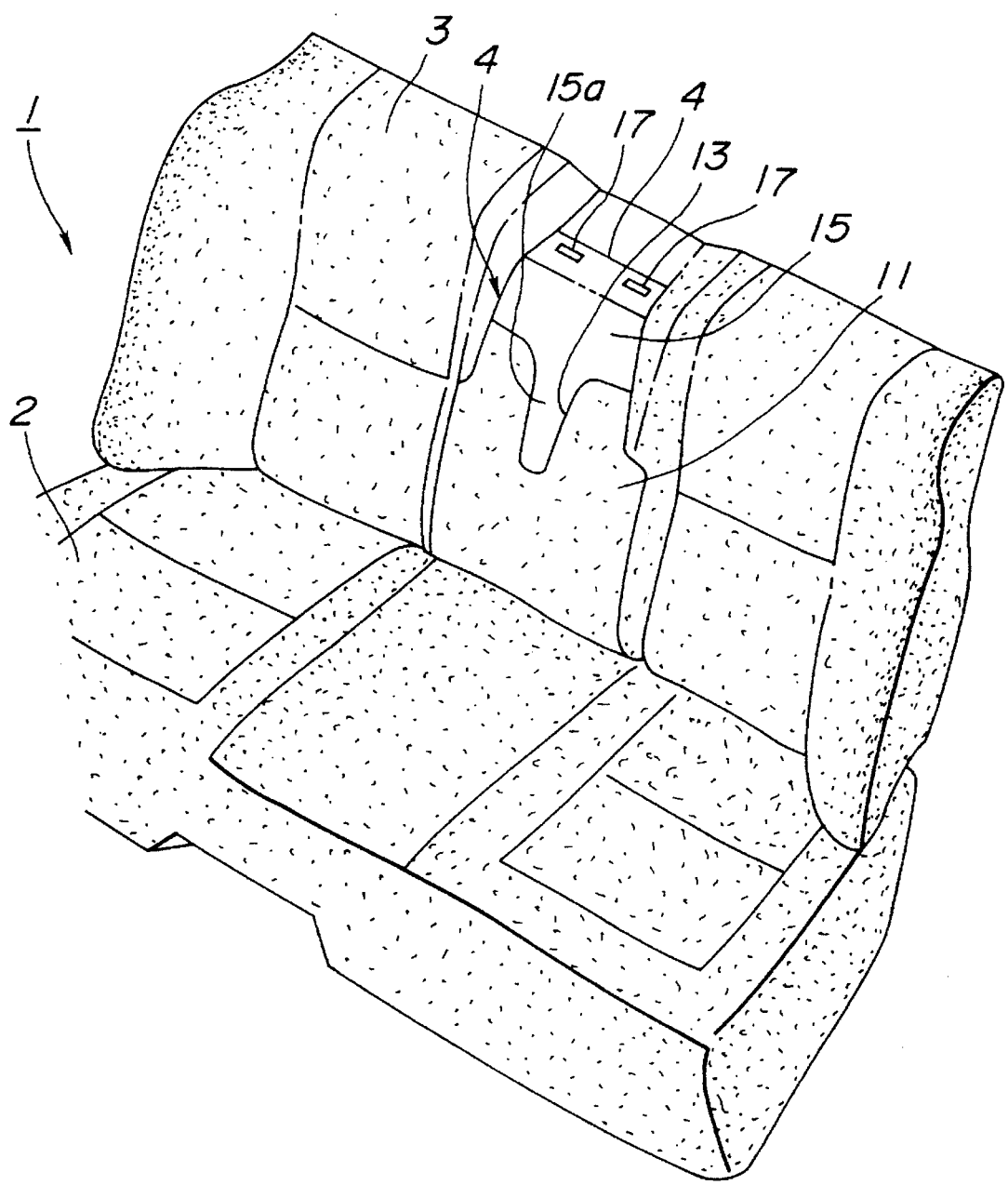
FIG. 2 is a schematic perspective view of the child seat of FIG. 1 in a retracted state.
Figure 3:
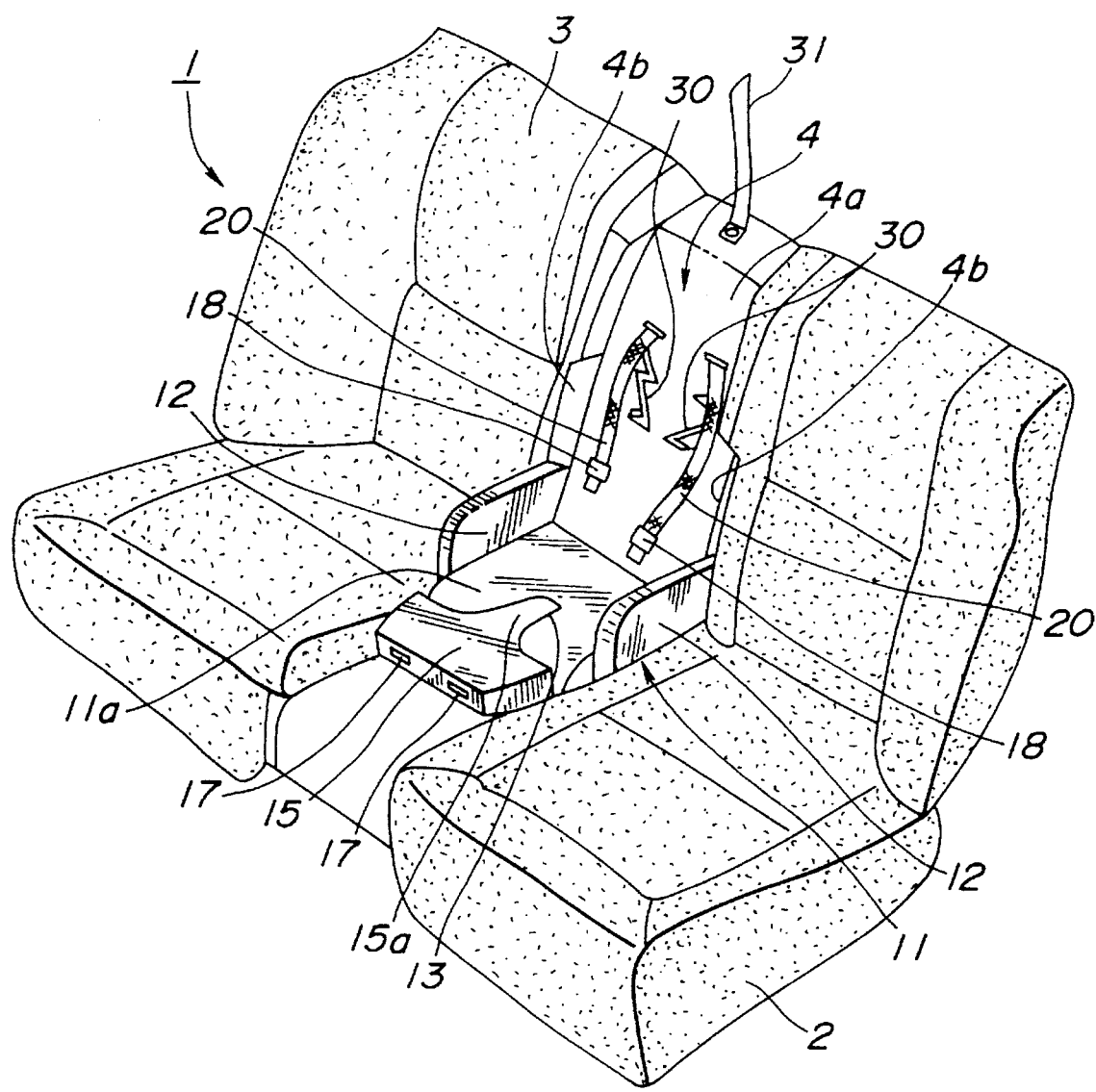
FIG. 3 shows a perspective view for explaining a process of unfolding the child seat of the invention, from the state shown in FIG. 2, to that of FIG. 1.

Further, the child seat 10 according to the invention may also be provided with a substantially T-shaped chest pad 15 which, as may be seen by comparing FIGS. 1–3, is disposed on a rotatable hinge pin 16 in such a way as to be interlocked with the seat cushion 11 and to be pivotably mounted so as to rotate upwardly to form a chest pad 15. The lower cut-out portions defining the T-shape act in conjunction with the V-shape of the interlocking end of the seat cushion 11 so as to define spaces for snugly retaining the upper legs of a child occupying the child seat 10.

The chest pad 15 has insert openings 17, 17 at a top side thereof for receiving belts 20, 20 therethrough. Mounting tongues 18, 18 are provided at point end portions of each of the belts 20, 20 for being received by the insert openings 17, 17.

In order to further improve the utility of the invention, the child seat 10 is provided with belt adjusting means, as will be explained hereinbelow with reference to FIG. 4.

Figure 4:
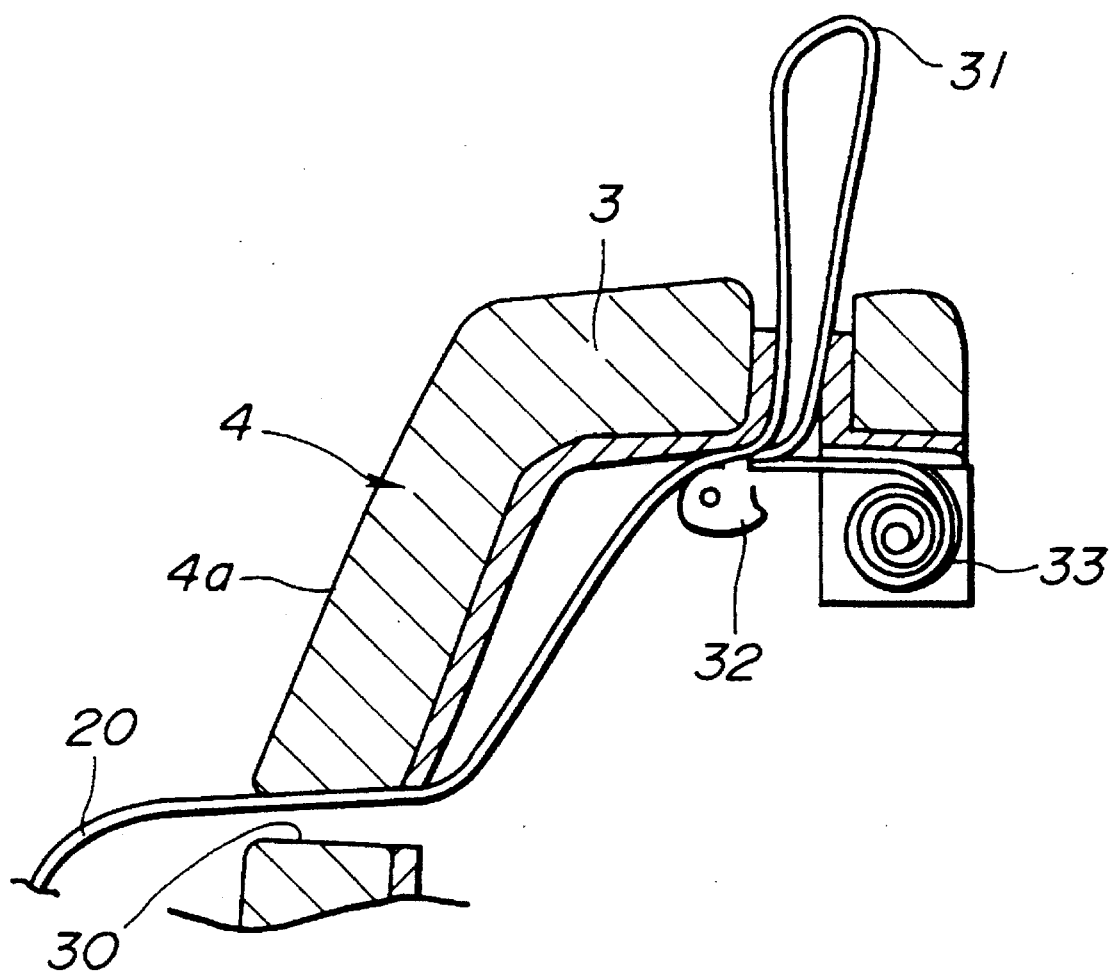
FIG. 4 is an enlarged cross-sectional view of a belt portion of the child seat of the invention for illustrating operation of a belt length adjusting means thereof.

As may be seen in FIGS. 3 and 4, the child seat back 4a is provided with a pair of grooves formed therethrough and having a stepped, elongate configuration for allowing the belts 20, 20 to be set at a desired height depending on the size of the child seat occupant.

Further, provided in a space behind the child seat back 4a, a pair of spring retractable roll-type belt mountings 33, 33 are provided, the belts being wound around the belt mountings 33, 33 and held by a locking member 32 which may be manually released by a lever 31 mounted at an upper side of the seat back 3 of the bench seat. According to the present embodiment, the lever is provided at a position substantially above the recess 4.

Thus, according to actuation of the lever 31, a the lock member 32 is released and a desired length of the belt 20 may be extracted for establishing a comfortable fit for a child to occupy the seat. Then, when the lever 31 is released, the lock member closes to firmly hold the belt 20 in place at the desired length. According to the above-described structure, a child may be held on a highly stable seat cushion 11 while gently but firmly being held on all sides by the wings 12, 12, the side cushions 4b, 4b, the chest pad 15 and the child seat back 4a.

Thus, a secure built-in child seat with high security against lateral G forces with simple construction and operability may be provided at low cost.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A built-in child seat for an automotive vehicle, comprising:

a bench type vehicle seat including an elongate seat cushion and elongate seat back, said seat back including a recess portion therein at a predetermined position;

a child seat cushion rotatably hinged at a lower side of said recess to be foldable between a first position wherein said seat cushion is disposed within said recess and a second position wherein said seat cushion is horizontally disposed to rest on a seat cushion of said vehicle passenger seat, said child seat cushion having wing portions formed at left and right sides thereof and oriented perpendicular to the plane of said child seat cushion;

a chest pad pivotally mounted at a distal end of said child seat cushion so as to be folded upwardly so as to be vertical when said child seat cushion is disposed in said second position to be positioned against a front side of a seat occupant;

restraining means selectively engage able between a rear surface of said recess and an edge of a distal end of said chest pad, said restraining means being adjustable in length by a adjustment apparatus disposed behind said rear surface of said recess.

2. A built-in child seat as set forth in claim 1, wherein said distal end of said child seat cushion is formed with a forked configuration, a pair of left and right extending sections of said forked configuration active as leg supports for an occupant of said child seat and said pivotally mounted chest cushion being pivotally mounted on a shaft disposed proximate a cleft portion of said forked configuration.

3. A built-in child seat as set forth in claim 2, wherein said chest pad is T-shaped such that, in said upward vertical position, legs of a seat occupant are held between said left and right extending sections of said child seat cushion and an upper horizontal bar portion of said T-shaped chest pad.

4. A built-in child seat as set forth in claim 3, wherein surface contours of said child seat cushion and seat chest pad are complementary, such that, in said first position said child seat cushion and seat chest pad may be folded into said recess substantially as a single unit.

5. A built-in child seat as set forth in claim 1, wherein said restraining means comprises a pair of belts housed respectively on retractable spring operated reels behind said rear surface of said recess, said belts being retained by respective locking mechanisms which may be selectively engaged and disengaged according to tugging motion on said belts respectively.

6. A built-in child seat as set forth in claim 5, wherein each of said belts includes an engaging member at a distal end thereof, said edge of said distal end of said chest pad including two corresponding engaging members for effecting said selective engagement of said restraining means.

7. A built-in child seat as set forth in claim 1, wherein side wall portions of said recess include side cushions active to partially surround a child seat occupant.

8. A built-in child seat as set forth in claim 1, wherein said rear surface of said recess is padded.

9. A built-in child seat as set forth in claim 1, wherein said rear surface of said recess includes two slits through which said belts are disposed.

10. A built-in child seat as set forth in claim 9, wherein said silts are respectively formed as a substantially narrow single elongate opening having a plurality of parallel step portions spaced vertically from each other, a length of each of said step portions being at least equal to a width of said belt.

11. A built-in child seat as set forth in claim 1, wherein said recess is provided in a center area of said seat back of said bench type vehicle seat.

* * * * *